United States Patent
Parajon

(10) Patent No.: US 9,612,073 B2
(45) Date of Patent: Apr. 4, 2017

(54) HANDGUN RESET ENHANCEMENT APPARATUS

(71) Applicant: Tactical Trigger Innovations, LLC, Tampa, FL (US)

(72) Inventor: Jorge Parajon, Tampa, FL (US)

(*) Notice: Subject to any disclaimer, the term of this patent is extended or adjusted under 35 U.S.C. 154(b) by 0 days.

(21) Appl. No.: 14/725,128

(22) Filed: May 29, 2015

(65) Prior Publication Data

US 2016/0348995 A1 Dec. 1, 2016

(51) Int. Cl.
| F41A 19/10 | (2006.01) |
| F41A 19/12 | (2006.01) |
| F16F 1/06  | (2006.01) |

(52) U.S. Cl.
CPC ............. F41A 19/10 (2013.01); F16F 1/06 (2013.01); F41A 19/12 (2013.01); F16F 2236/04 (2013.01)

(58) Field of Classification Search
CPC .......... F41A 19/06; F41A 19/10; F41A 19/12; F41A 19/16; F41A 19/17; F16F 1/06
USPC .............................................. 42/69.01–69.03
See application file for complete search history.

(56) References Cited

U.S. PATENT DOCUMENTS

| 5,086,579 | A  |    | 2/1992  | Flatley |
| 5,386,659 | A  |    | 2/1995  | Vaid |
| 5,406,731 | A  |    | 4/1995  | Stevens |
| D371,591  | S  |    | 7/1996  | Lenkarski |
| 6,560,909 | B2 | *  | 5/2003  | Cominolli ............... F41A 17/72 42/70.05 |
| 7,617,628 | B2 |    | 11/2009 | Curry |
| 8,510,980 | B2 |    | 8/2013  | Lee |
| 8,555,539 | B2 |    | 10/2013 | Pflaumer |
| 8,769,713 | B2 |    | 7/2014  | Lee |
| 8,819,978 | B2 |    | 9/2014  | Lee |
| 8,863,425 | B2 |    | 10/2014 | Lee |
| 9,140,510 | B1 | *  | 9/2015  | Muska ..................... F41A 19/42 |
| 2011/0289811 | A1 | * | 12/2011 | Gentilini ................ F41A 17/72 42/69.02 |
| 2013/0340309 | A1 |    | 12/2013 | Lee |
| 2014/0047751 | A1 |    | 2/2014  | Lee |

(Continued)

OTHER PUBLICATIONS

Adjuster, Tweaking Trigger Bar, Mar. 15, 2011, mp-pistol.com, pp. 1-2.*

(Continued)

Primary Examiner — Stephen M Johnson
Assistant Examiner — Benjamin Gomberg
(74) Attorney, Agent, or Firm — Larson & Larson, P.A.; Justin P. Miller; Patrick A. Reid

(57) ABSTRACT

The invention described herein improves the trigger feel and reset perception using three primary alterations.

First, the addition of a spring that presses against the trigger bar, further increasing the reset action.

Second, the addition of a pin or screw to a specific location on the trigger bar, increasing the deformation of the trigger bar when pushed to the side by the slide. The result is the trigger bar holds a greater force, increasing the tactility of the reset.

Third, the use of a specific sear shape, altering the camming action of the sear, and thus how the sear interacts with the trigger bar and firing pin.

Each of these inventions alone results in an improved trigger feel and action. Together the result is a gun with greatly improved trigger characteristics.

7 Claims, 14 Drawing Sheets

(56) References Cited

U.S. PATENT DOCUMENTS

2014/0121736 A1\* 5/2014 Boser ................... A61N 1/3752
                                                            607/116
2014/0137454 A1   5/2014 Lee
2014/0196340 A1\* 7/2014 Dugger .................... F41A 9/64
                                                            42/49.01

OTHER PUBLICATIONS

Cohland, Closeup: Trigger Pre-Travel reduction (aftermarket), Aug. 31, 2013, Glock.pro, pp. 1-2.\*

\* cited by examiner

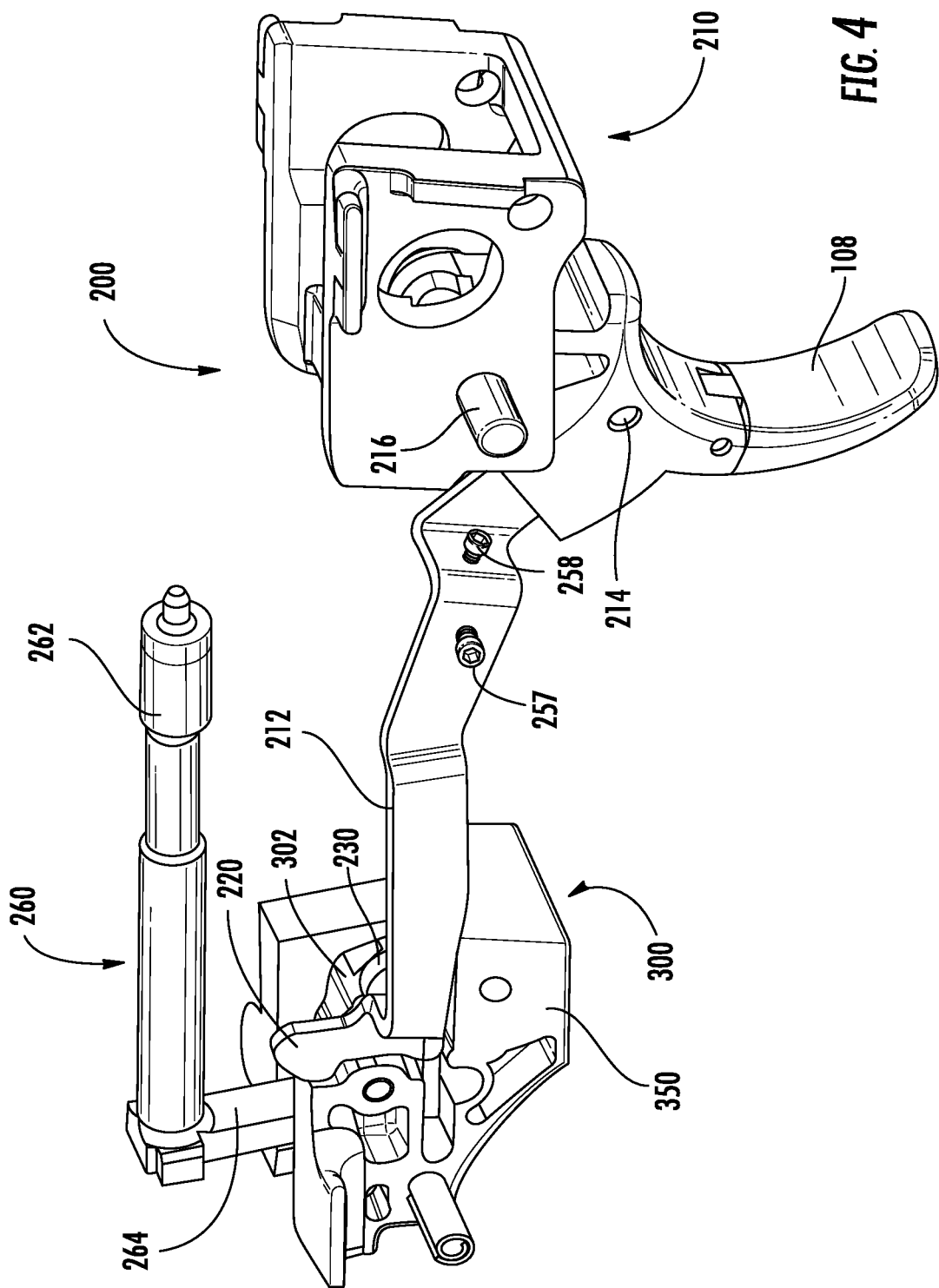

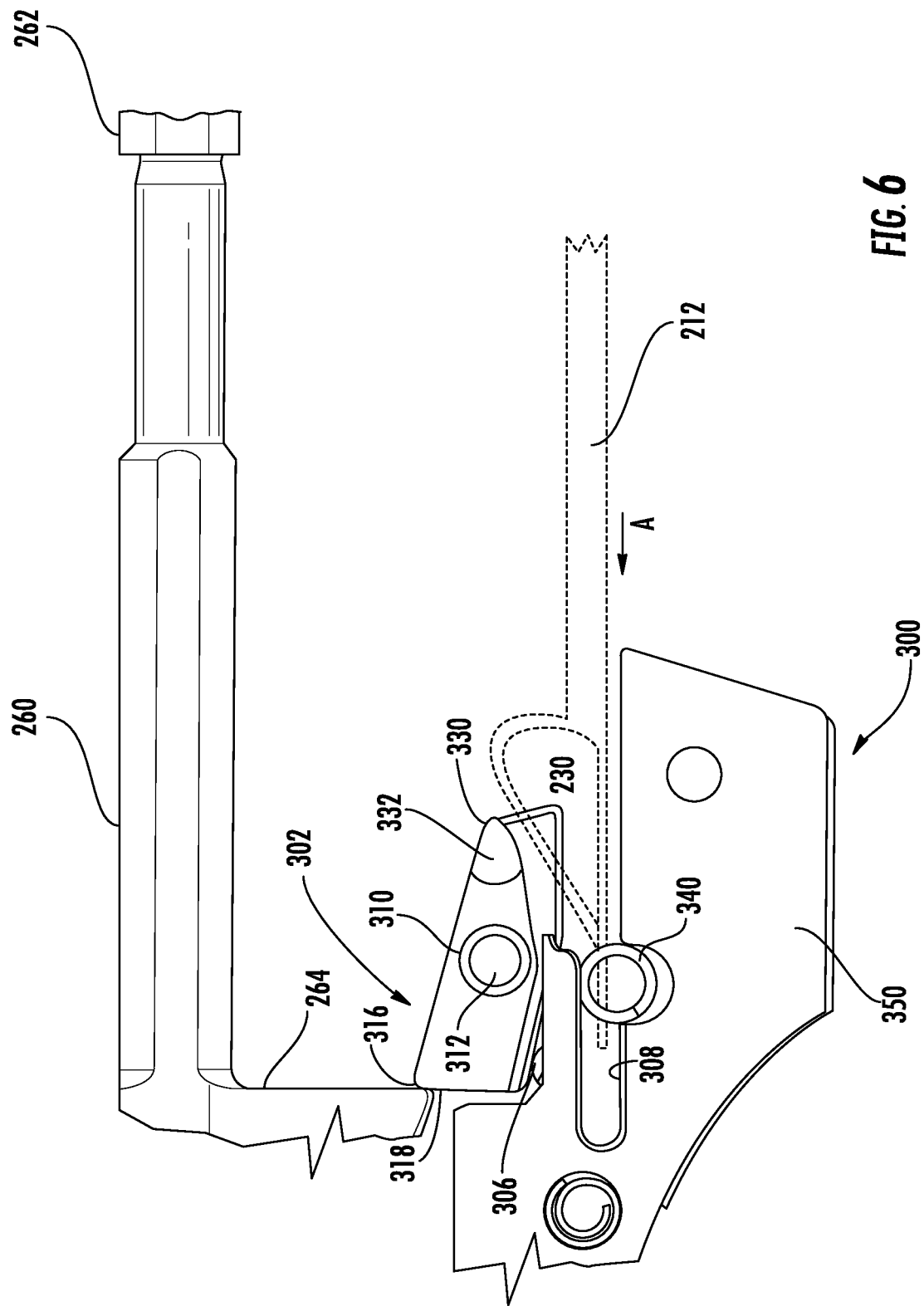

HANDGUN RESET ENHANCEMENT APPARATUS

FIELD

This invention relates to the field of handguns and more particularly to a system that upgrades the firing mechanism of a striker-type handgun.

BACKGROUND

The performance of a handgun is determined by the behavior of its constituent parts. The combination of these parts determines the guns weight, recoil, accuracy, cycle time, and so forth.

In competition settings the most important characteristics of the user are accuracy and cycle time. Accuracy is a measurement of the user's ability to place a bullet where intended, and cycle time is the time that elapses between the discharge of a round and the discharge of the subsequent round.

It is the communication between the gun and the user that largely determines the accuracy and cycle time of the gun. This communication occurs through the trigger; the only part of the gun that the user controls during normal use. Thus, alterations to the gun that result in changes to the feel and behavior of the trigger have significant effects on the user's perception of the gun's functionality, and ultimately the user's performance.

Furthermore, the user's awareness of the state of the gun is critical to its safe operation. The user must be able to feel when the gun is prepared to fire the next round to avoid accidental discharge.

But users often already own a gun, and do not wish to purchase a new and unfamiliar gun in order to achieve greater feedback.

What is needed is a collection of parts that can be added to an existing gun, the parts improving communication through the trigger, thereby increasing user accuracy, decreasing cycle time, and maintaining or improving safety.

SUMMARY

The feel and behavior of the trigger is discussed in terms of: trigger stroke, pull weight, pre-travel, stacking, break weight, trigger over-travel, reset distance, creep, and reset. Each term is defined as follows.

A trigger stroke is one complete pull of the trigger from front to back, resulting in the gun being fired.

Pull weight is the measurement of the force required to complete the trigger stroke.

Pre-travel, is the distance the trigger travels prior to engagement of the trigger bar with the sear, the sear being a key part of the mechanism that ultimately fires the gun. During pre-travel the only resistance felt against the trigger is due to the trigger return spring, the trigger return spring attached to the trigger bar.

Stacking is the progression of resistance to trigger travel. This resistance increases as the trigger moves through the trigger stroke. Stacking refers to the additive process of increasing trigger resistance as a result of the additional forces that add to, or stack on, as the trigger progresses through the stroke.

Break weight is the force required to cause the trigger to release the striker, which in turn fires the round. Ideally, this is the greatest force required during trigger pull, and the result of the collection of stacked forces.

Trigger over-travel is the distance the trigger continues to travel after the striker is released.

Reset distance is the minimum amount of trigger travel required from firing the round, to the firearm being prepared to fire the next round. This is explained more thoroughly below.

A reset is what occurs after a round has been fired, and the user has allowed the trigger to travel far enough forward to "reset," or allow the user to fire the next round.

The concept of the reset characteristics of a gun is nuanced, and requires additional explanation.

After the firing pin is released and the round is fired, the user lowers pressure on the trigger. The trigger return spring then moves the trigger forward. During this forward motion the trigger resets, indicating that the gun is prepared to fire the next round.

The trigger reset characteristics of the gun are a combination of two factors. First, the reset distance, and second, the reset feel.

The reset distance is the measurement of how far the trigger must travel from firing one round to being prepared to fire the next. Generally enthusiasts prefer a short reset distance to lower the time required to fire the next round.

But every gun has some amount of distance between the reset point and the rest point of the trigger, referred to as pre-travel. If the user cannot perceive the point at which the gun has reset, the user will allow the trigger to travel too far forward, wasting time that could have been used to fire the next round. Additionally, if the reset is too subtle for the user to perceive he may believe the gun is not prepared to fire the next round, and cause an unintentional discharge.

In a competition setting the reset location must be communicated through tactile feedback to the user through the trigger. During competition the user is wearing earmuffs or earplugs due to the loud sound of the gun, other guns are firing, and the user is unlikely to hear any audible indication of a reset. Given that a skilled shooter can fire six rounds in a single second, the reset must be easily felt in order to increase efficiency of movement by reducing the cycle time.

Furthermore, in dynamic high stress critical situations, such as a home invasion, the brain may block out certain sensory inputs. With certain sensory inputs blocked, such as hearing, it is important that the user be able to perceive the operation of the gun in as many ways as possible. Making the reset tactile provides an additional way the user can perceive the reset, helping to avoid unintentional discharges.

The feel of the reset can be enhanced by the addition and/or modification of springs, alterations to the sear to increase trigger bar deformation, and alterations to the trigger bar to increase its elastic deformation.

Turning to the gun generally, there are four main parts. The frame, or main structural component of gun, the slide, which interfaces to the top of the frame, the barrel, encompassed by the slide, and the fire control mechanism, which is the collection of parts inside the gun that manages and fires the rounds.

What follows is a discussion of the parts of an exemplary handgun. An understanding of the workings of the gun will aid in understanding of the enhancements provided by the Handgun reset enhancement apparatus.

The frame of the gun interfaces with the slide by way of a sliding connection. The firing axis, or direction of bullet travel, is defined along the length of the barrel.

The section of the fire control mechanism perceived by the user is limited to the trigger, which when actuated by the user activates a cartridge, which in turn discharges a bullet from the barrel.

In its entirety, the fire control mechanism includes the trigger, trigger bar, sear, and firing pin.

Operation begins with the trigger. The trigger is two-piece and articulated, acting as a safety mechanism. Pressure is required on the lower half of the trigger to deactivate the trigger safety, helping to prevent accidental discharge.

Pressure by the user's finger against the trigger causes the trigger to pivot, the pivoting motion causing the trigger bar to move toward the back of the gun. The motion of the trigger bar is opposed by the trigger return spring, which seeks to pull the trigger bar toward the front of the gun.

The end of the trigger bar includes a curved portion that pushes up the front of the sear, causing the sear to rotate. This rotation ultimately removes the sear from the path of the firing pin, allowing the firing pin to slide forward, activating the cartridge, and firing the gun.

The end of the trigger bar further includes an upward protrusion that pushes a striker block upward, removing it from the path of the firing pin.

The gas created by the firing of the gun causes the slide and firing pin to move toward the rear of the gun. The slide interacts with an upward protrusion of the trigger bar, pushing the trigger bar to one side, allowing the sear to reset its position.

As the slide returns forward, powered by the recoil spring that was compressed during the rearward motion, the slide and firing pin pull the next cartridge from the magazine, loading it into the barrel.

The round having been fired, the user then allows the trigger to move forward. After the trigger bar moves past the sear, it snaps back into position, moving from the side of the sear to in-front of the sear. This is referred to as the reset, and user perception of this location is key to this invention.

The invention described herein improves the trigger feel and reset perception using three primary alterations. These alterations together form a reset assist mechanism.

The inventions disclosed within include, but are not limited to:

First, the use of a specific sear shape, altering the camming action of the sear, and thus how the sear interacts with the trigger bar and firing pin.

Second, the addition of a pin or screw to a specific location on the trigger bar, increasing the deformation of the trigger bar when pushed to the side by the slide. The result is the trigger bar holds a greater force, increasing the tactility of the reset.

Third, the addition of a spring that presses against the trigger bar, further increasing the reset action.

Each of these inventions alone results in an improved trigger feel and action. Together the result is a gun with greatly improved trigger characteristics.

BRIEF DESCRIPTION OF THE DRAWINGS

The invention can be best understood by those having ordinary skill in the art by reference to the following detailed description when considered in conjunction with the accompanying drawings in which:

FIG. 4 is a third view of a section of the example firing mechanism.

FIG. 6 is an internal side view of the firearm, showing a section of the firing mechanism.

DETAILED DESCRIPTION

Figure 1:
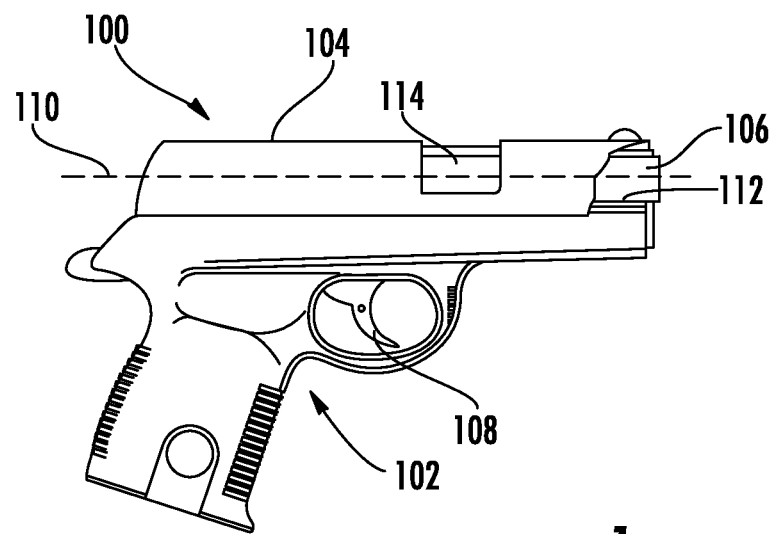
FIG. 1 is a view of a firearm consistent with the embodiments described herein.

Reference will now be made in detail to the presently preferred embodiments of the invention, examples of which are illustrated in the accompanying drawings. Throughout the following detailed description, the same reference numerals refer to the same elements in all figures.

FIG. 1 is a view of a firearm consistent with the embodiments described herein. The firearm 100 is shown, with its constituent parts being the frame 102, slide 104, barrel 106, and trigger 108. The barrel 106 penetrates the front opening of the slide 104. The barrel 106 and slide 104 are linked, cooperating to load and eject shells. The combination of the barrel 106 and slide 104 define the longitudinal firing axis 110. The barrel 106 receives cartridges at its rear, here hidden by the slide 104.

A trigger 108 is pivotally mounted optionally to the frame 102 to actuate the firing mechanism. The frame is generally made of a polymer material, metal, or a combination of polymer and metal.

The slide 104 is fitted to rails 112 of the frame 102 to guide the reciprocal movement of the slide 104 along the longitudinal firing axis 110. The rails 112 extend along the underside of the slide 104 in the longitudinal direction and are cooperative with the frame 102 to allow the cycling of the slide 104 between forward and rearward positions.

The slide 104 includes an ejection port 114 and mechanism (not shown) that ejects a cartridge through the ejection port 114 upon firing the firearm 100 or upon manual cycling of the slide 104.

Figure 2:
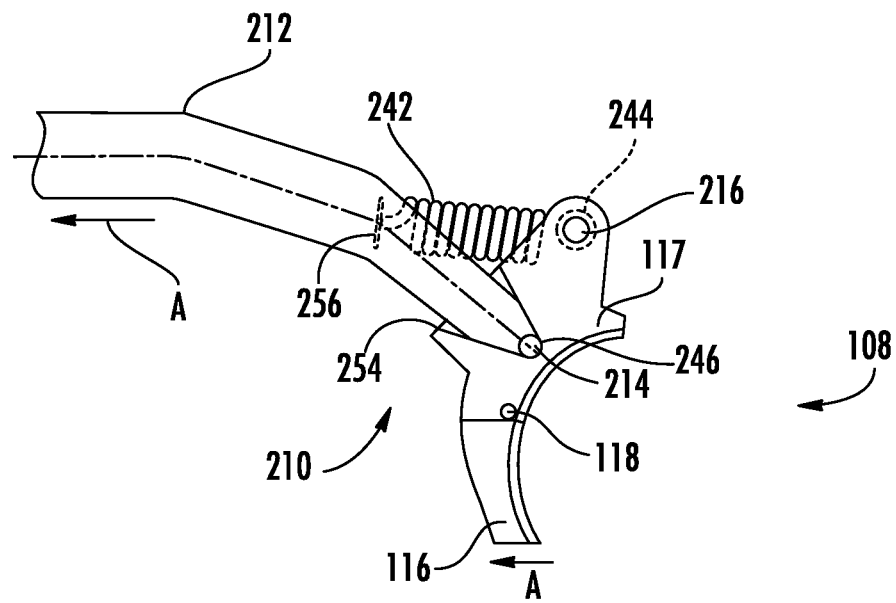
FIG. 2 is a view of a section of the example trigger assembly mechanism.
Figure 3:
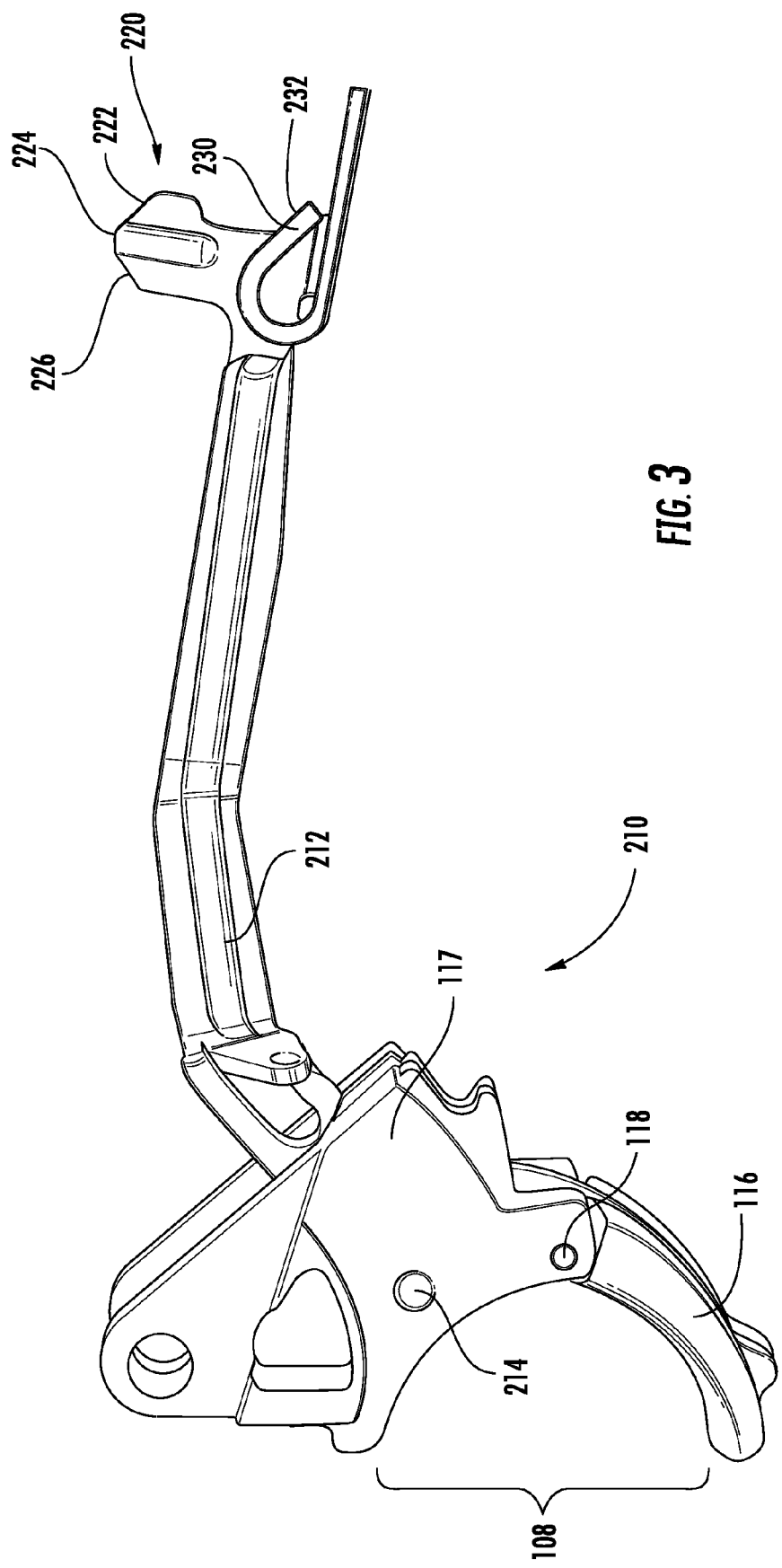
FIG. 3 is a second view of a section of the example firing mechanism.

FIGS. 2 & 3 illustrate an embodiment of the trigger assembly 210. FIG. 2 shows the front section of the trigger assembly from the right side, FIG. 3 shows the entire trigger assembly 210 from the left side.

The trigger assembly is the trigger bar 212, trigger 108, and interconnecting parts.

The trigger 108 is made up of a lower trigger section 116 and an upper trigger section 117, connected at connection pin 118.

Viewed from the side, the trigger bar 212 has a slightly arched shape.

The front of the trigger bar 212 connects to upper trigger section 117 at trigger bar pin 214. Trigger return spring 242 connects between the trigger pin fulcrum 244, at trigger pin 216, and trigger bar 212 at trigger return spring termination 256.

The trigger 108 pivots about the trigger pin fulcrum 244 during use, shown as motion in direction A. The trigger pin fulcrum 244 interfaces to the frame 102 by the trigger pin 216. As the trigger 108 is pulled in direction A, there is rotation about trigger pin fulcrum 244, and the trigger bar 212 moves in direction A. This stretches trigger return spring 242, which the user feels as resistance.

The trigger bar 212 pivots within the trigger bar slot 254.

On the portion of the trigger bar opposite to the trigger 108 is the trigger bar spur 220. The trigger bar spur 220 interacts with the striker block (not shown), acting as a safety mechanism. The trigger bar spur 220 includes three primary sections: a spur upramp 222, a spur top 224, and a spur downramp 226. Modification of the trigger bar spur 220 is discussed below.

Near the trigger bar spur 220, but lower, is the trigger bar sear engagement section 230. As is explained more thoroughly below, the trigger bar sear engagement section 230, and particularly the trigger bar engagement surface 232, interact with the sear 302 (not shown), ultimately causing the firearm 100 to fire.

FIG. 4 is a third view of a section of the example firing mechanism. The left side of the figure shows the sear assembly 300, comprised generally of the sear block 350 and partially visible sear 302.

Protruding from the sear block 350 is the firing pin 260, with firing pin tip 262 and depending leg 264. The firing pin tip 262 interfaces with a cartridge, causing a bullet to be discharged. The depending leg 264 interfaces with the sear, the sear holding the depending leg 264 back until released to activate the cartridge.

The firing pin 260 is propelled toward the front of the gun by a firing pin spring (not shown). The firing pin spring is energized by either manually pulling the slide 104 toward the rear of the firearm 100, or the motion of the slide 104 during the recoil created by the discharge of a round.

Also shown is firing mechanism 200, which includes trigger assembly 210, through which the trigger pin 216 rotates, allowing rotation of the trigger 108. Trigger bar pin 214, connecting trigger 108 and trigger bar 212 are again shown.

Also shown is trigger bar fulcrum pin 257 and trigger bar pre-travel pin 258.

Trigger bar fulcrum pin 257 performs a primary function and numerous secondary functions.

The primary function of the trigger bar fulcrum pin 257 is to create a location where the trigger bar 212 will rock or pivot, allowing for additional energy to be stored in the trigger return spring 242.

The secondary functions of the trigger bar fulcrum pin 257 are: 1) to plastically, or reversibly, deform the trigger bar 212 to allow the trigger bar 212 to store energy, and 2) to reduce the surface area of the trigger bar 212 contacting the frame 102 of the firearm 100, thus allowing the trigger bar 212 to slide with less friction.

The result of the modifications is increased tactility of the reset.

Trigger bar pre-travel pin 258 decreases the forward motion of the trigger bar 212 during cycling of the firearm 100. As a result, the user needs only to depress the trigger 108 a short distance, while still activating a cartridge.

Figure 5A:
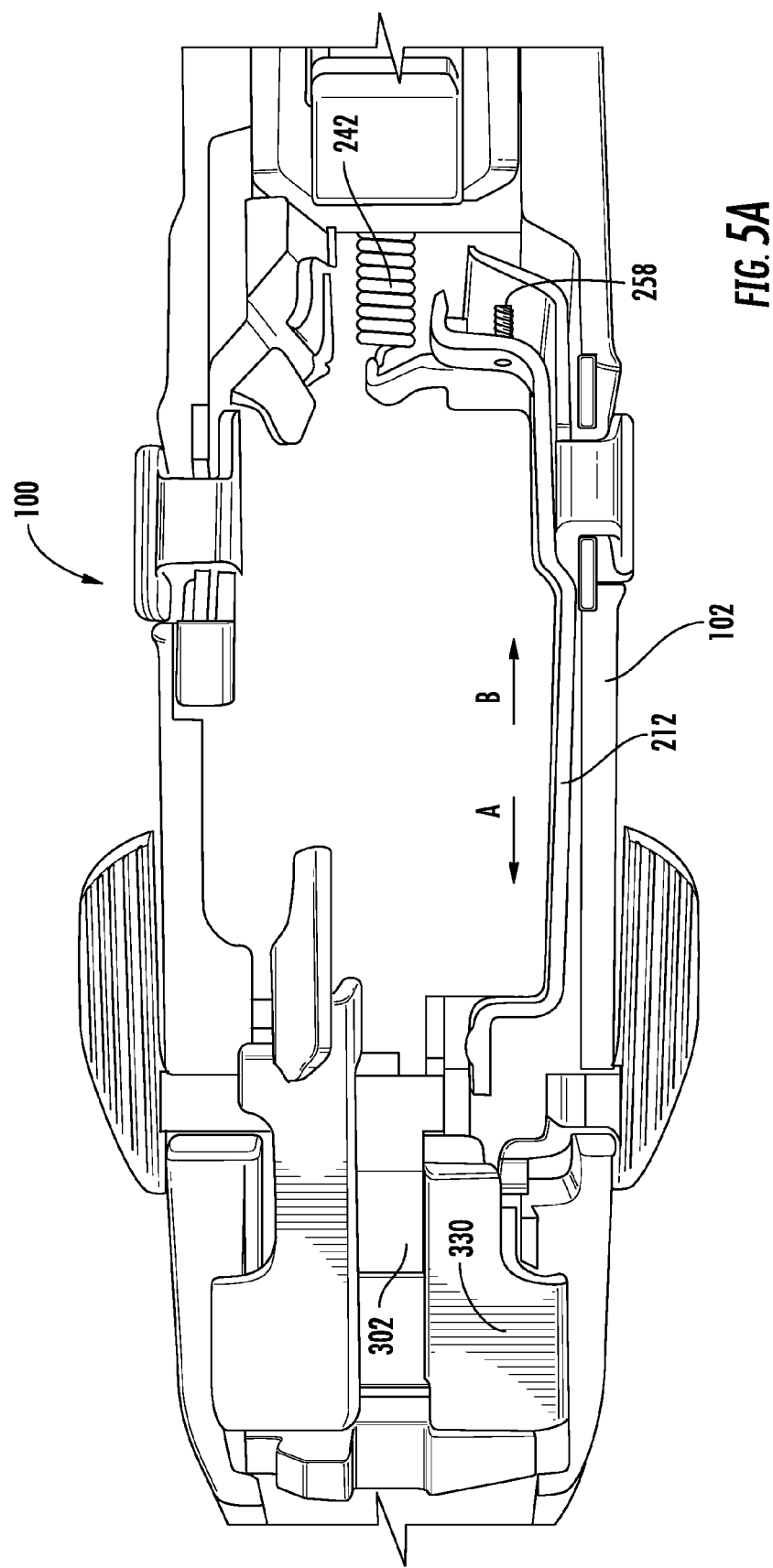
FIGS. 5A-5B are overhead views of the firearm, showing the firing mechanism installed.
Figure 5B:
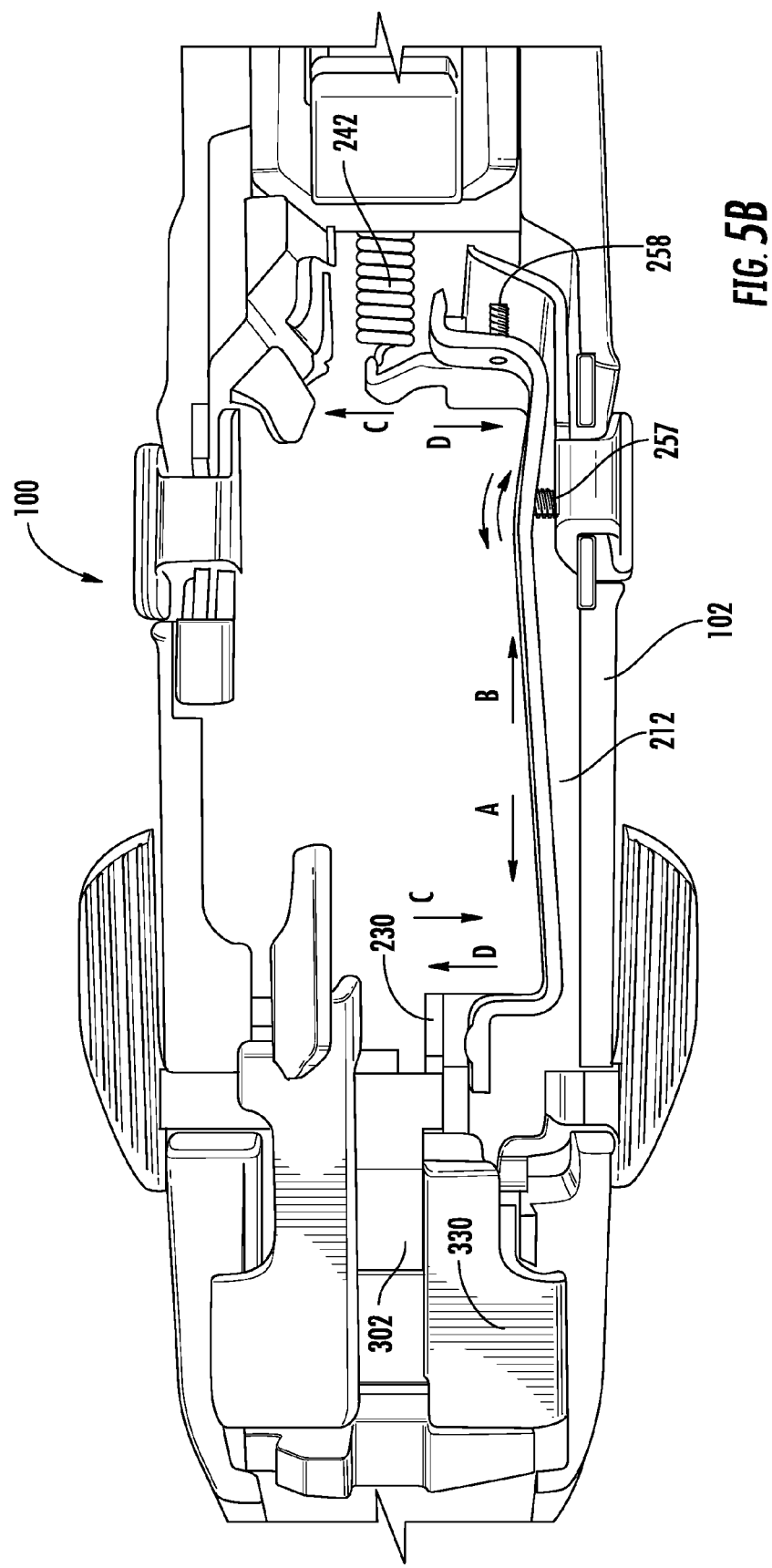

FIGS. 5A and 5B show an overhead view of the firearm 100 with the firing mechanism installed within the firearm 100.

Viewed from above, the trigger bar 212 has the shape of a wide letter U. The trigger return spring 242 is shown, which pulls the trigger bar 212 toward the front of the firearm 100. The bottom of the wide letter U of the trigger bar 212 hugs the side of the frame 102, and makes room for the magazine (not shown) that occupies the center of the firearm 100 during operation.

Direction A is the direction of travel for the trigger bar 212 when the trigger is pulled, and direction B is the direction of travel for the trigger bar when the trigger is released.

FIG. 5A shows the trigger bar prior to the addition of the trigger bar fulcrum pin 257. In the absence of the trigger bar fulcrum pin 257 the trigger bar 212 hugs the inside of the frame 102.

FIG. 5B shows the trigger bar after the addition of the trigger bar fulcrum pin 257. The trigger bar 212 is now forced toward the center of the firearm 100, away from the frame 102. The trigger bar 212 now acts as a lever, pivoting about the trigger bar fulcrum pin 257.

During the firing of a round the trigger bar sear engagement section 230 is pushed in direction C, away from the sear 302. The trigger bar 212 then pivots about the trigger bar fulcrum pin 257, causing counter-clockwise motion of the trigger bar 212, in turn stretching the trigger return spring 242, also shown as direction C.

When the user lowers pressure on the trigger 108, allowing the trigger bar 212 to move forward, the trigger bar sear engagement section 230 resets, shown as direction D. Then a portion of the energy stored by the trigger return spring 242 is released as it moves, also shown as direction D, increasing the strength of the reset.

In addition, there is an additional, but smaller, force caused by the trigger bar 212 returning to its original shape. After reset, the trigger bar 212 tries to return to its original shape, resulting in additional force at the end of the trigger bar 212 opposite the trigger 108. This force increases the strength and tactility of the reset. Trigger bar fulcrum pin 257 increases the deformation of the trigger bar 212 when pushed to the side by the slide 110. The result is the trigger bar 212 holds a greater force, increasing the tactility of the reset.

The trigger bar fulcrum pin 257 and the trigger bar pre-travel pin 258 can be adjustable, using a screw or a bolt; or fixed, using a dowel pin, spring pen, headed pin, welded bump, or through deformation of the trigger bar itself to create a protrusion.

Also shown in FIGS. 5A and 5B is the trigger bar pre-travel pin 258. The ability of the trigger bar pre-travel pin 258 to reduce the forward motion of the trigger bar is more apparent in the overhead view, showing how the trigger bar pre-travel pin 258 contacts internal parts of the firearm 100, reducing travel.

FIG. 6 is an internal side view of the firearm 100, showing a section of the firing mechanism.

Sear assembly 300 includes the primary parts of the sear 302 and sear block 350. An explanation of the operation of the sear 302 is helpful, before explaining the specific shapes and their effects.

The sear 302 cooperates with the trigger bar 212 to release the firing pin 260 in a controlled manner. This is accomplished by rotation of the sear 302, the rotation caused by the trigger bar 212, the rotation ultimately removing the sear 302 from the path of the firing pin 260, the firing pin 260 pushed by the firing pin spring.

Focusing on the front of the sear 302, a number of elements are shown. Review of FIGS. 7-10 will also help to focus attention on relevant portions of the sear 302.

The sear 302 is kept in a downward facing position by the sear spring (hidden within the sear block 350), which in turn presses against the sear spring plunger 306, which in turn contacts the sear 302. The sear 302 rotates about fulcrum 310, which is penetrated by a fulcrum opening 312.

The shape of the sear 302 is separated into numerous areas. Divided by the fulcrum 310, the sear 302 is separated into a front section 324 and a rear section 326. The combination of the front section 324 and rear section 326 make up the sear 302, with the exception of the sear engagement protrusion 330.

The rear corner 316 is shown as a sharp corner. At the back of the sear 302 is the rearward surface 318, shown as a flat surface. Along the top of the sear 302 is the upper surface 320, with a corresponding lower surface 322 along the bottom.

The sear 302 further has a sear left face 338 and a sear right face 339. The fulcrum 30 connects sear left face 338 and a sear right face 339, and divides the sear 302 into rear section 326 and front section 324.

The sear engagement protrusion 330 extends outwardly from the front section 324, or sear right face 339, ending in sear engagement side surface 332. The sear engagement protrusion 330 is substantially parallel to the fulcrum 310, and substantially perpendicular to the sear right face 339. Along the curved front/bottom section of the sear engagement protrusion 330 is the sear engagement lower surface 334.

Figure 8:
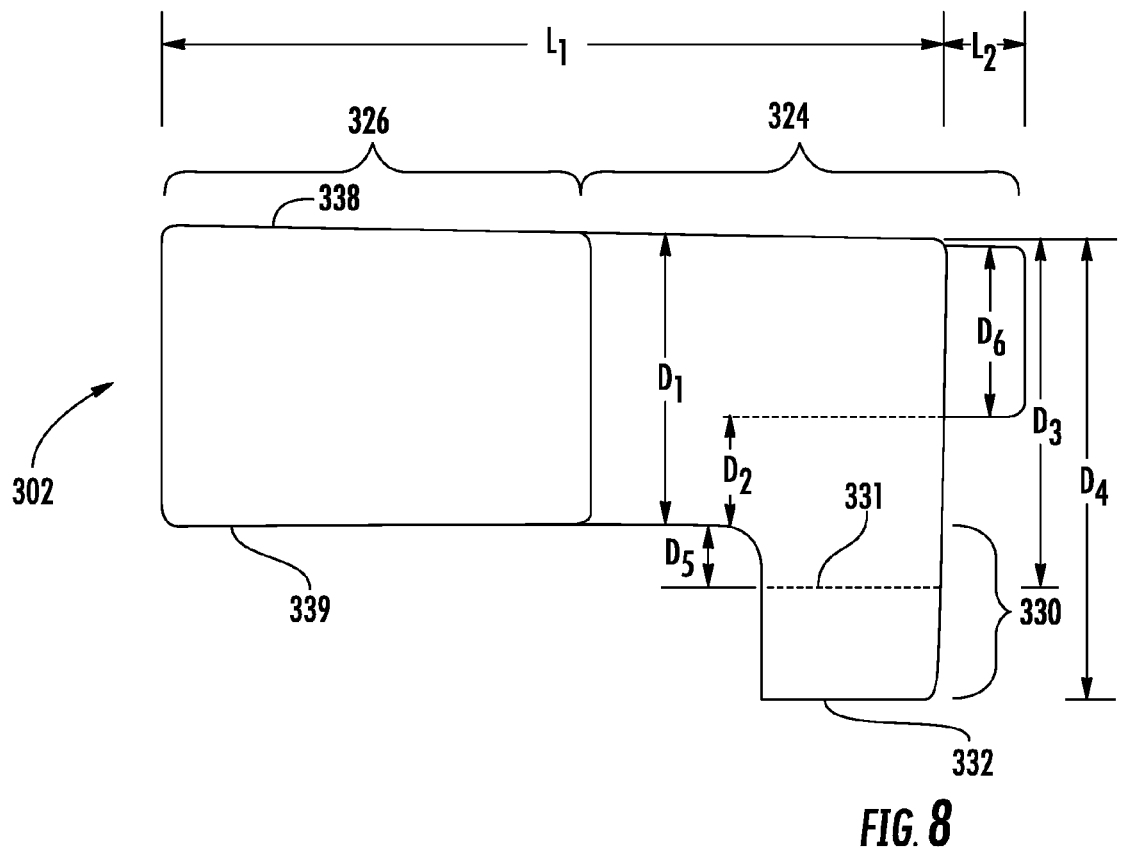
FIG. 8 is a top view of an embodiment of the sear.

FIG. 8 shows an overhead view of the sear 302 with markings for dimensions.

$L_1$ is the total length of the sear 302, excluding the front surface 328. This distance $L_1$ is approximately 11.80 mm.

$L_2$ is the additional length of the sear that results from the addition of the front surface 328. This distance $L_2$ is approximately 1.55 mm.

$D_1$ is the width of the rear section 326 and front section 328 of the sear 302. This distance $D_1$ is approximately 4.35 mm.

$D_2$ is the width difference between the front surface 328 and the total sear width. This distance $D_2$ is approximately 1.85 mm.

$D_3$ is the distance from the sear left face 338 to the original sear engagement side surface 331 as sold by the original manufacturer. In the original sear this distance $D_3$ is 5.3 mm.

$D_4$ is the distance from the sear left face 338 to the sear engagement side surface 332. Note that this distance is longer because the disclosed invention includes a lengthened sear engagement protrusion 330. Stated differently, the disclosed distance from the sear left face 338 to the sear engagement side surface 332, is greater than from the sear left face 338 to the original sear engagement side surface 331.

For the disclosed sear 302, distance $D_4$ is increased by an amount greater than 0.0 mm. The ideal range of increased is believed to be between 0.5 mm and 1.0 mm. The resulting measurement ranges from approximately 5.8 mm to 6.3 mm, with a preferred measurement of 6.10 mm.

$D_5$ is the distance from the sear right face 339 to sear stock protrusion 331. In the original sear this distance $D_5$ is 0.95 mm.

$D_6$ is the distance from the front surface 328 to nearly the sear left face 338. In the original sear this distance $D_6$ is 2.5 mm.

Returning to operation of the sear assembly 300, as the user depresses the trigger 108, the trigger bar 212 moves toward the rear of the gun, as shown in FIG. 6 by arrow A.

The trigger bar engagement surface 232 of the trigger bar sear engagement section 230 engages the sear 302 along the sear engagement lower surface 334. Contact begins at the trigger bar engagement point 232 and the sear engagement point 336.

Figure 9:
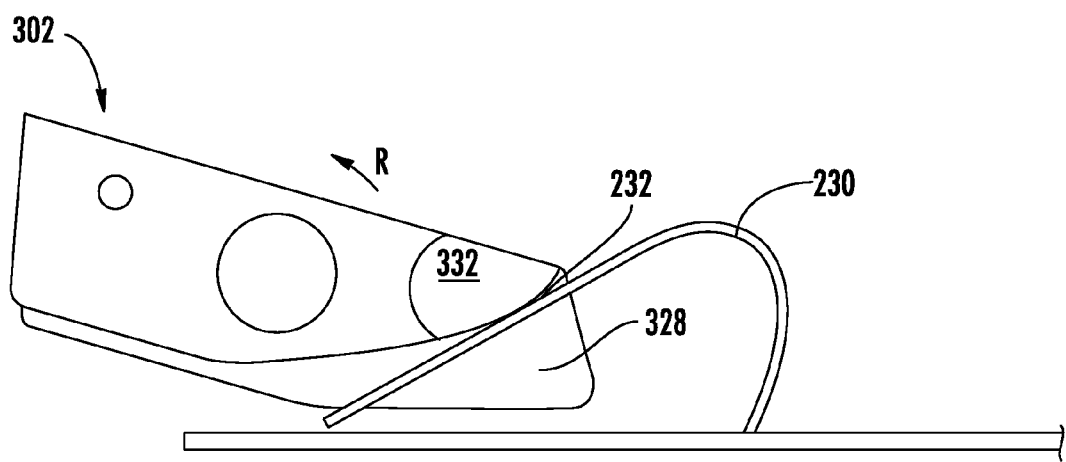
FIG. 9 is a side view of an embodiment of the sear, showing its interface with the trigger bar.
Figure 10:
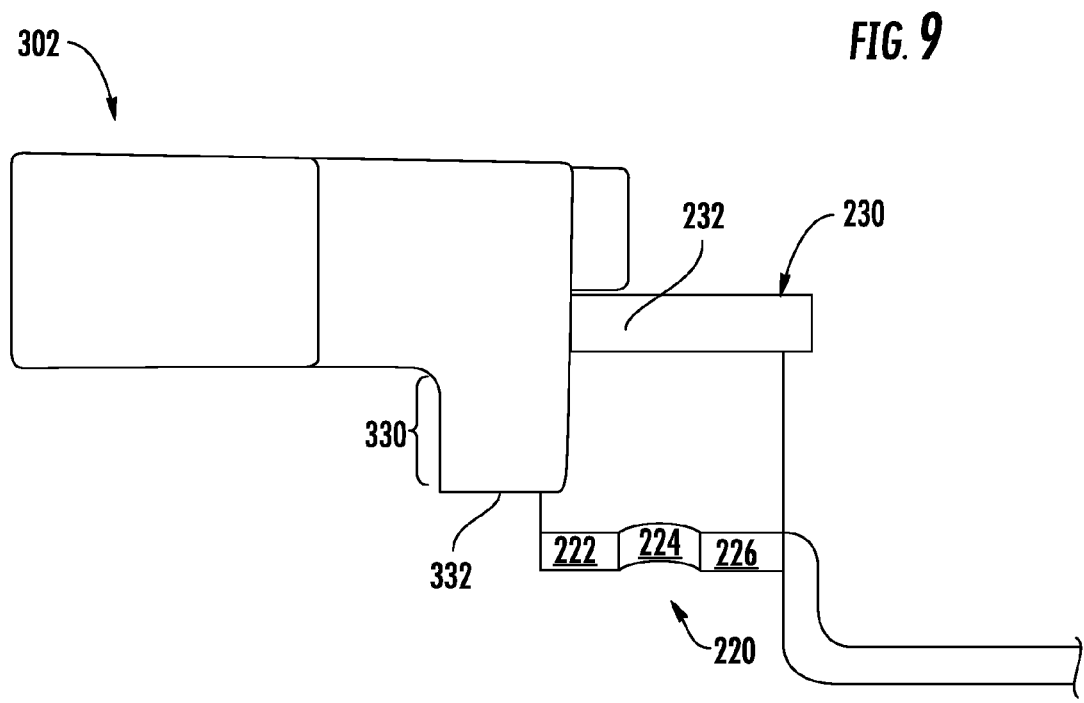
FIG. 10 is a top view of an embodiment of the sear, showing its interface with the trigger bar.

As the trigger bar 212 continues to move backward, the front section 324 of the sear 302 rotates upward, turning about the fulcrum 310, shown in FIG. 9 as R. This rotation in turn causes the rear section 326 of the sear 302 to rotate downward.

In this interaction the trigger bar 212 is acting as a cam follower, causing rotation of the sear 302, which is acting as a cam.

As the trigger bar continues to move in direction A, the movement of the sear 302 is controlled by the interaction of the shapes of the sear engagement lower surface 334 and trigger bar engagement surface 232.

The trigger bar engagement surface 232 is flat. Viewing the interaction of the parts as a camming action, this flat surface provides a constant force. This allows for alterations of the curved surface of sear engagement lower surface 334 to affect the rotation of sear 302.

Figure 7:
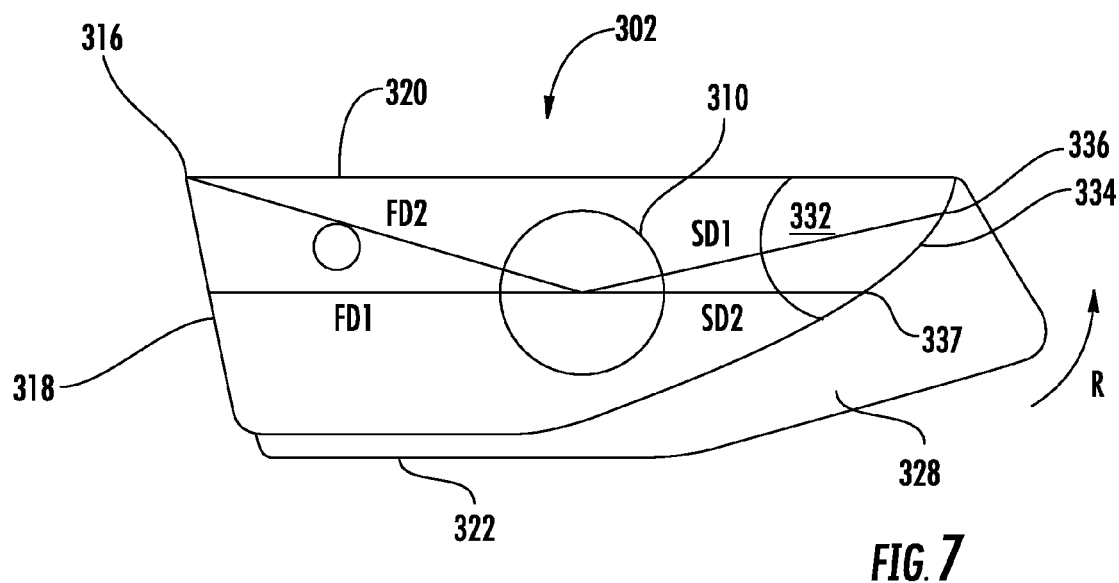
FIG. 7 is a side view of an embodiment of the sear.

For illustration, four distances are shown in FIG. 7. The purpose is to illustrate the effect of changes in shape to the sear engagement lower surface 334, and the respective effect on the rotation speed of the sear 302.

Each distance, SD1 and SD2, can be viewed as a lever arm. It is common knowledge that the tip of a longer lever arm must be moved further to achieve the same angular motion as would be achieved with a shorter lever arm. As shown in FIG. 7, SD1 is longer than SD2. The trigger bar engagement surface 232 first comes into contact with the sear engagement point 336, and the firing pin 260 is released by the time rotation R has caused the new contact point to be sear disengagement point 337.

Given that the lever arm is shortening between sear engagement point 336 and sear disengagement point 337, and that for the same movement a shorter lever arm causes more rotation than a longer lever arm, the speed of the sear 302 rotation increases as the trigger bar 212 moves toward the rear of the gun, in direction A.

Stated differently, as the trigger bar 212 moves further into the sear block 350, the relative speed of rotation with respect to the transverse movement of the trigger bar 212 increases.

This increase in relative movement is accompanied by an increase in force required by the user against the trigger 108. As is also commonly known, a longer lever arm turns more easily than a shorter lever arm. For example, it is easier to loosen a bolt using a long wrench as compared to a short wrench.

Thus, as SD decreases in length, and the sear 302 rotates closer to the position at which the firing pin 260 is released, the force the user must apply against the trigger 108 increases. The profile of this force increase provides feedback to the user, helping the user to determine that the firing pin 260 is nearing release.

Turning attention to the rear section 326 of the sear 302, the interaction of the sear 302 with the firing pin 260, and particularly the firing pin depending leg 264, will be discussed.

While the shape of the sear engagement lower surface 334 provides an indication of nearing release by virtue of increasing force, the sear 302 disclosed within has an additional feature to indicate release. Specifically, the shape of rear corner 316.

Recall that any resistance of the trigger bar 212 is communicated back to the user and affects the feel or resistance of the trigger 108.

When firing a gun whether in the environment of competition shooting or in a high stress critical incident, it is important that the user be able to positively identify the location within the travel of the trigger 108 just prior to the discharge of the round.

Knowing this location allows the user to hold the trigger 108 just short of releasing the firing pin 260, leaving a minimal amount of additional travel to release the firing pin and fire the round.

Thus, the sear 302 disclosed within includes a protrusion that causes a slight rearward motion of the firing pin 260 immediately prior to disengagement. This slight rearward motion of the firing pin 260 translates to additional resistance on the trigger 108, which can be felt by the user, communicating that the firing pin 260 is nearing release.

This rearward motion is caused by the distance FD2 being greater than FD1. Thus, as the sear rotates in a counter-clockwise fashion, the depending leg 264 of the firing pin 260 is pushed away from the sear 302 fulcrum 310. Being pushed away from the fulcrum 310 causes additional compression to the firing pin spring (not shown), the firing pin spring resisting this compression, the resistance communicated to the trigger 108. The user perceives this additional resistance as the firing pin 260 being nearly released.

Finally, as the user continues to depress the trigger 108, the trigger bar 212 causes the sear 302 to complete its rotation, causing the rear section 326 of the sear 302 to pass beneath the depending leg 264 of the trigger bar 212. This allows the firing pin 260 to be pushed forward by the spring, and the firing pin tip 262 strikes the round.

After release of the firing pin 260, the sear 302 is released. The force of the sear spring takes over, rotating the sear 302 forward slightly in a clockwise rotation. The depending leg 264 passes over the sear 302 in a forward direction. The firearm 100 fires and the slide 104 recoils. Propelled by the force of the recoil the slide 104 is now moving toward the rear of the firearm, and the depending leg 264 moves rearward past the sear 302 along with the rearward motion of the slide 104. By an operation that will be explained more thoroughly below, the trigger bar spur 220, riding within the slide channel 120, is pushed to the side by the slide camming surface 122 (see FIG. 14). As the trigger bar 212 is pushed to the side, the trigger bar sear engagement section 230 is no longer pushing against the sear 302, and thus the sear 302 can complete its forward clockwise rotation. The trigger bar 212 is now resting against the sear engagement side surface 332. This is shown in FIG. 13B.

Once the depending leg 264 passes over the sear 302, traveling rearward with the slide's 104 recoil, clears the rear section 326 of the sear 302, and the slide 104 had mirrored its maximum rearward motion, the sear 302 will complete its rotation cycle, returning the front section 324 to its full downward position, and the rear section 326 to its upward position, thereby engaging the depending leg 264 again.

This operation happens very rapidly, and the user has yet to remove pressure from the trigger 108.

Thus, the trigger bar 212 is still it is rearward position.

With the round fired and the slide 104 in its forward resting position, the user lowers the pressure on the trigger 108, allowing the trigger return spring 242 to carry the trigger bar 212 toward the front of the firearm 100.

As the trigger bar sear engagement section 230 clears the sear engagement protrusion 330, the trigger bar 212 snaps back toward the center of the firearm 100, again resting the trigger bar sear engagement section 230 against the sear front surface 328.

This physical motion and contact creates a sound and a feel, which needs to be perceived by the user. The tactile feel, or "reset" is a result of a combination of factors.

First, the force of the trigger bar 212 returning to its resting position in front of the sear 302 causes the sound of this reset, commonly referred to as a "click." Recall that it was pushed away from the sear 302 by the motion of the slide 104. The trigger bar 212 wants to return to its non-deformed resting position, creating a source of potential energy that is discharged during the reset action.

Increasing the deformation of the trigger bar is one way to increase the force of this reset. The fulcrum action of the trigger bar 212 by the addition a trigger bar fulcrum pin 257 is another way to increase the reset force. Disclosed within is increased deformation of the trigger bar 212 by lengthening the sear engagement protrusion 330, as well as the addition of a trigger bar fulcrum pin 257.

As the trigger bar sear engagement section 230 clears the sear engagement protrusion 330, the trigger bar 212 snaps back toward the center of the firearm 100, again resting the trigger bar sear engagement section 230 against the sear front surface 328.

For a sear 302 in a stock gun, the distance the trigger bar 212 moves from sear stock protrusion 331 to the front surface 328 is $D_3$ minus $D_6$, or 5.3 mm minus 2.5 mm=2.8 mm.

This distance is increased using the sear 302 disclosed within. In some embodiments, for a modified gun the distance the trigger bar 212 moves from sear engagement side surface 332 to the front surface 328 is $D_3$ minus $D_6$, or 6.1 mm minus 2.5 mm=3.6 mm. This is an increase of 0.8 mm. This increased distance results in greater speed resulting from greater trigger bar 212 deformation. The result is a louder "click," and a tactile feeling.

Second, additional force can be added through the use of a spring. Disclosed within is reset assist spring 340 which acts to create additional force against the trigger bar 212.

Viewed from the side, as shown in FIG. 2, the trigger bar 212 is largely flat on its rear portion, and sloped downward on its front portion.

Figure 11:
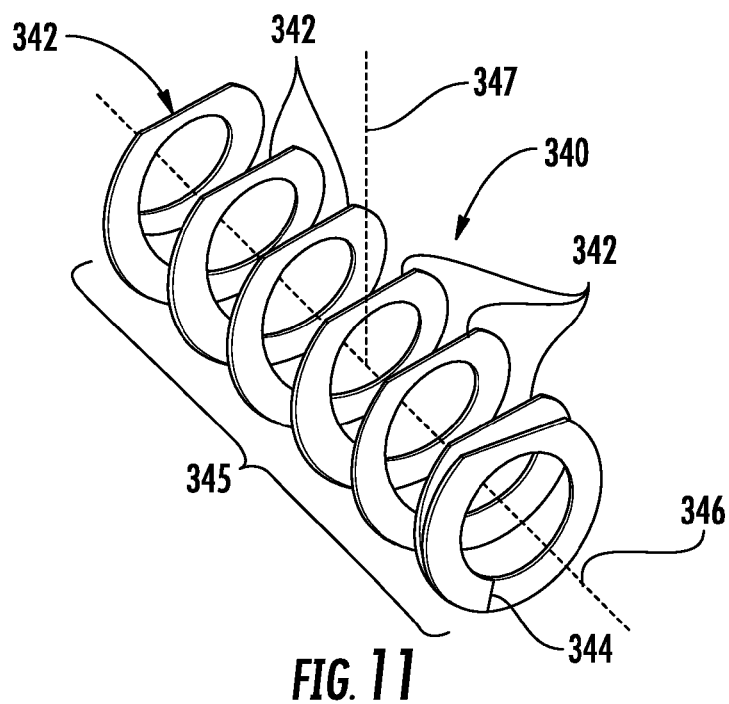
FIG. 11 is an isometric view of the reset assist spring.

FIGS. 11 and 12 show the reset assist spring 340. The reset assist spring 340 is any type of compression spring, such as a flat-wire spring, round spring, or conical spring. Additionally, other embodiments of the reset assist spring 340 are plastic, rubber, or other materials that can absorb and release energy, whether the materials take the shape of a tube, coiled spring, cylinder, cuboid, or other geometric shape. The embodiment shown in the figures is a flat-wire spring because such a spring stores more force in a smaller compressed size than comparable springs.

The termination of the spring shown in FIGS. 11 and 12 is known as the closed-end style. This is shown in FIG. 11, where the reset assist spring end 344 is resting against its previous coil. The use of a closed-end style spring is preferable because the trigger bar 212 is in sliding contact with the end, and a closed-end style spring provides a smoother surface. But the reset assist spring 340 can also be an open-end style spring.

Also shown in FIGS. 11 and 12 are the reset assist spring anti-rotation flats 342. As will be shown in the subsequent figures, the reset assist spring anti-rotation flats 342 interact with the sear block 350, preventing the reset assist spring 340 from rotating. By preventing rotation, the reset assist spring ends 344 are kept away from the sliding connection with the trigger bar 212. This ensures smooth sliding of the trigger bar 212 past the reset assist spring 340, which could be impeded if the trigger bar 212 were to catch on the reset assist spring end 344.

The parts of the reset assist spring 340 include the reset assist spring body 345, through which passes the reset assist spring longitudinal axis 346. The reset assist spring longitudinal axis 346 serves as a reference, passing through the center of the reset assist spring body 345. Perpendicular to the reset assist spring longitudinal axis 346 is the reset assist spring normal vector 347. Normal is defined as being at right angles to the reset assist spring longitudinal axis 346, or perpendicular.

Figure 12A:
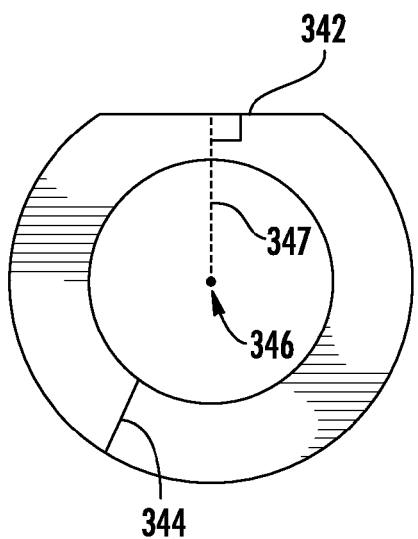
FIGS. 12A-12B are side views of the reset assist spring.

As shown in FIG. 12A, the reset assist spring anti-rotation flats 342 is perpendicular to the reset assist spring normal vector 347. Furthermore, if the reset assist spring anti-rotation flats 342 are envisioned as forming a plane, or a flat side, the plane/flat side is parallel to the reset assist spring longitudinal axis 346.

As is known in the art, a preferred method of specifying a spring having a specific force for use in a firearm 100 is by specifying a spring weight. Spring weight refers to the maximum force the spring can exert when compressed. The reset assist spring 340 can be provided in a variety of spring weights, allowing the user to tailor their firearm 100 characteristics to his particular taste.

Figure 12B:
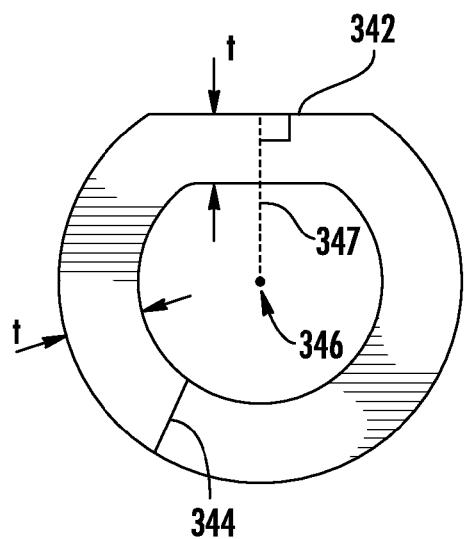

FIG. 12B shows a second embodiment of reset assist spring 340. In this embodiment the spring thickness is increased to compensate for the material lost to the creation of the anti-rotation flats 342. The result is a thickness t that is substantially identical at the anti-rotation flats 342 and across the remainder of the reset assist spring 340.

Maintaining a constant thickness t will provide a stronger spring with more consistent force characteristics.

Figure 13A:
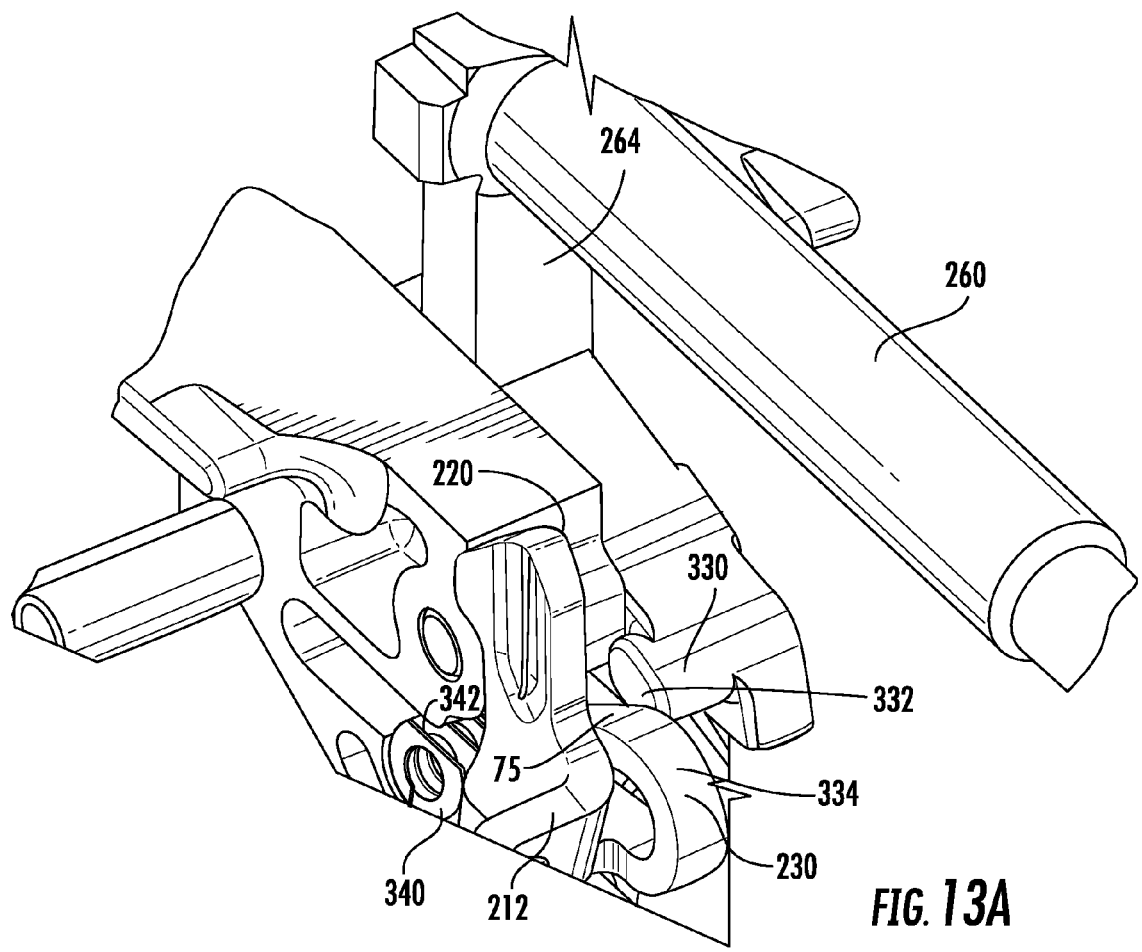
FIG. 13A is a first view of the firing mechanism in operation.
Figure 13B:
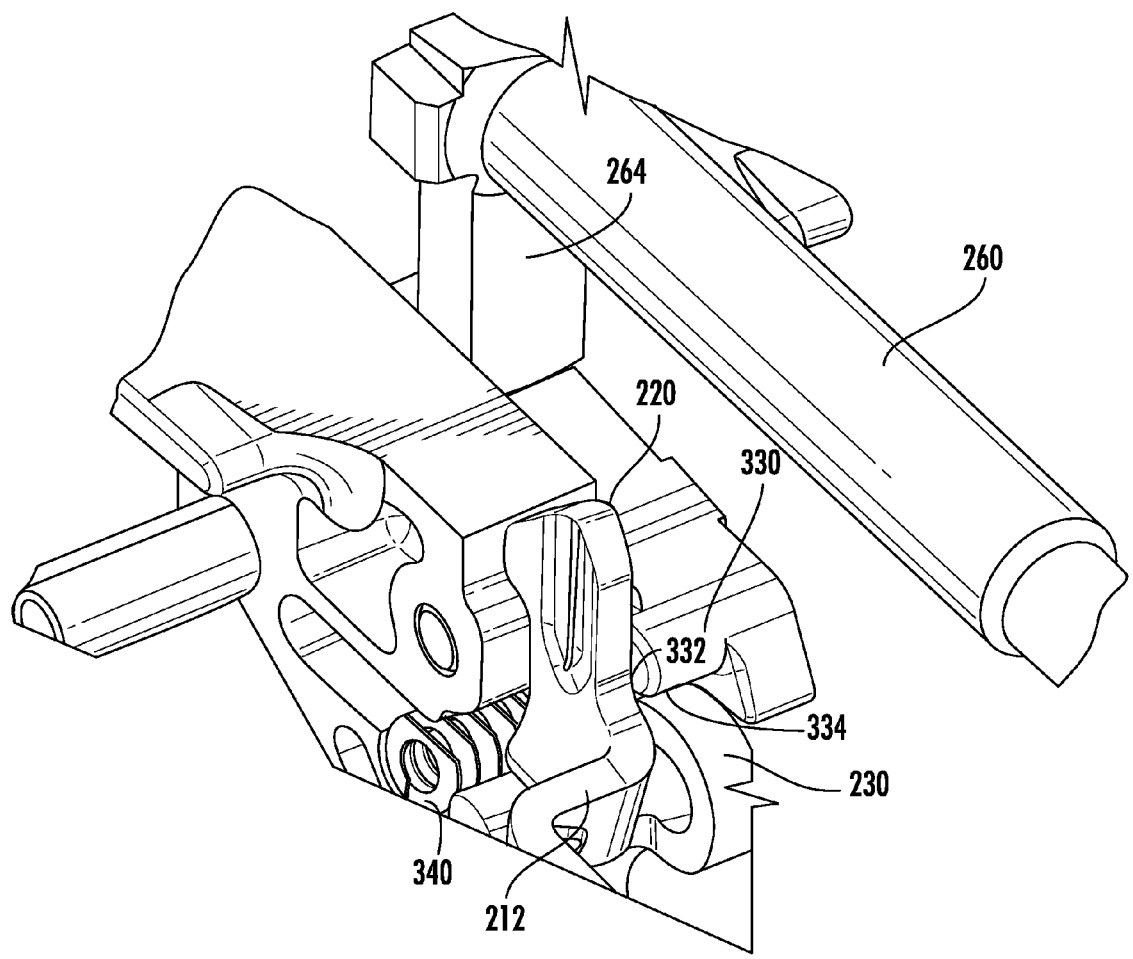
FIG. 13B is a second view of the firing mechanism in operation.

FIG. 13A is a view of the firing mechanism in operation, starting with the trigger in its most rearward position. The trigger bar sear engagement section 230 is resting against the sear engagement side surface 332.

In FIG. 13B the trigger bar 212 has moved toward the front of the firearm 100 and has allowed the trigger bar sear engagement section 230 to slide past the sear engagement side surface 332, resulting in a reset, or snapping of the trigger bar 212 back into resting position. The force of the reset was increased by the reset assist spring 340, which presses against the trigger bar 212, increasing the force by which the trigger bar sear engagement section 230 contacts the sear 302.

Figure 14:
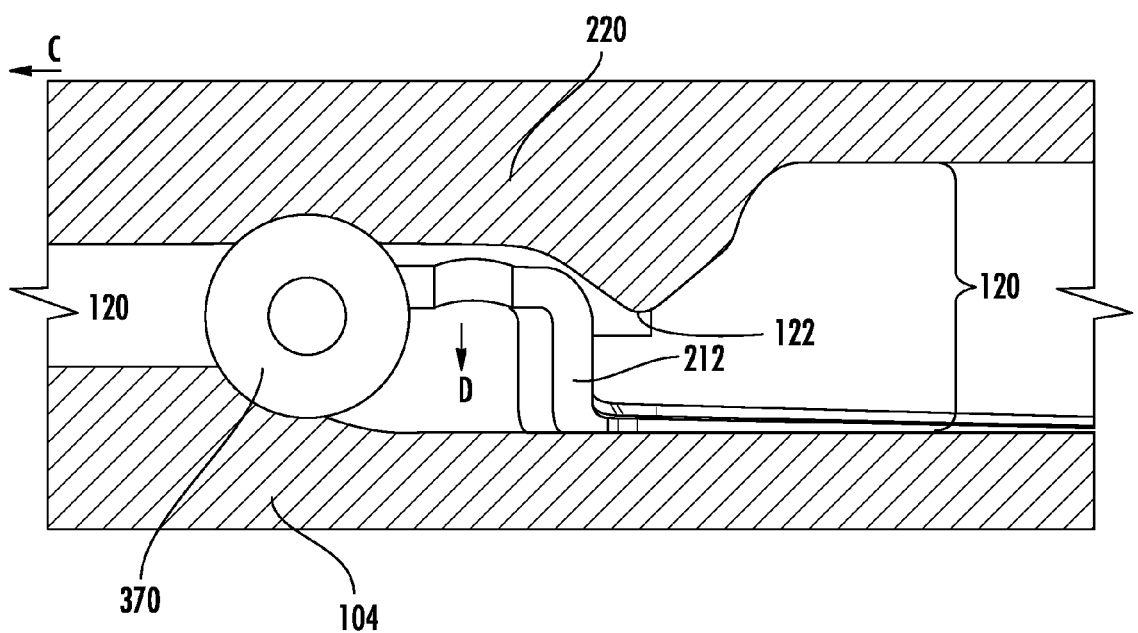
FIG. 14 is an overhead cutaway view of the plunger safety mechanism.

FIG. 14 is an overhead cutaway view of the plunger safety mechanism and slide 104.

As discussed above, after firing, the slide 104 moves toward the rear of the firearm 100, shown as direction C. The trigger bar spur 220 rides in the slide channel 120, contacting the slide camming surface 122 as the slide 104 moves in direction C. The slide camming surface 122 moves the trigger bar spur 220 in direction D, in turn pulling the trigger bar sear engagement section 230 (see FIGS. 13A & 13B) away from the sear 302, allowing the sear 302 to complete its forward rotation.

Figure 15A:
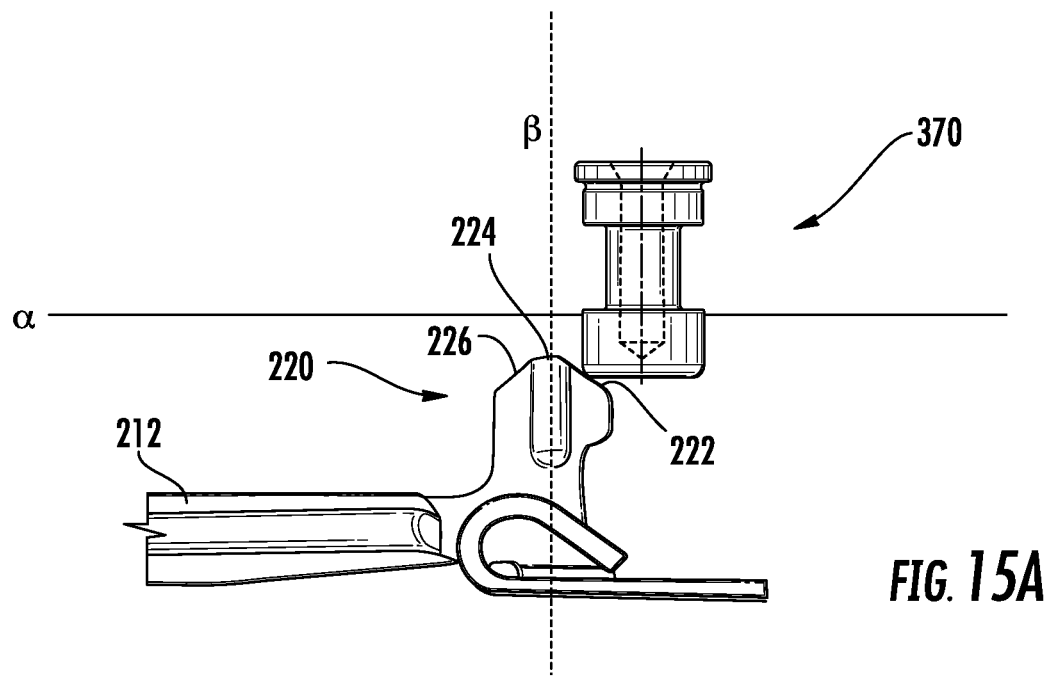
FIGS. 15A-15C are views of the plunger safety mechanism interacting with the trigger bar.
Figure 15B:
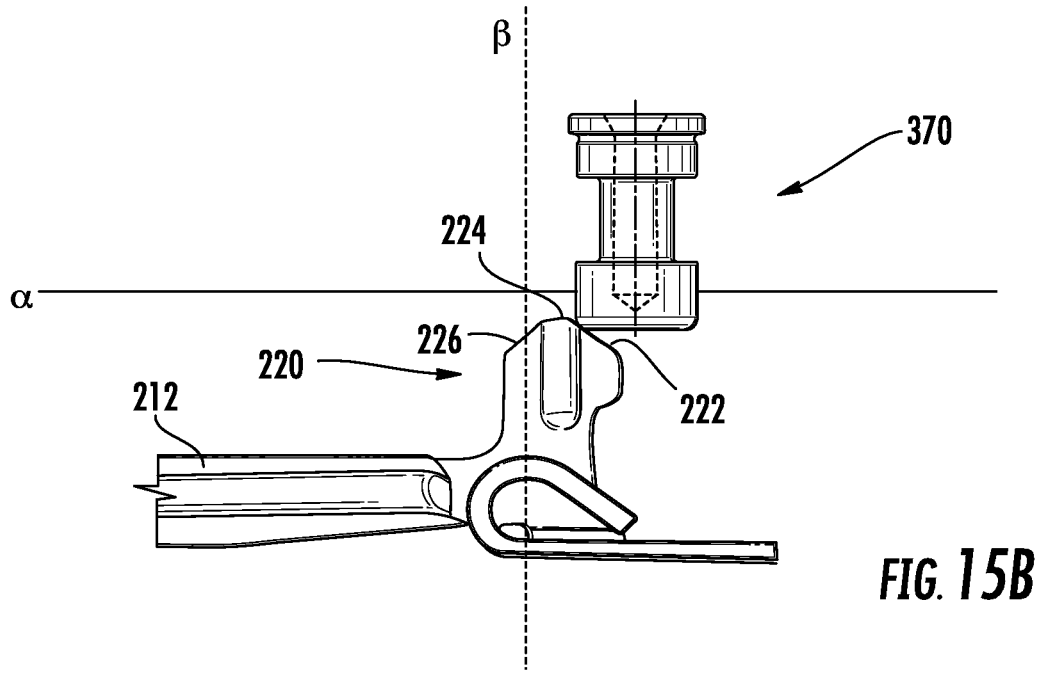
Figure 15C:
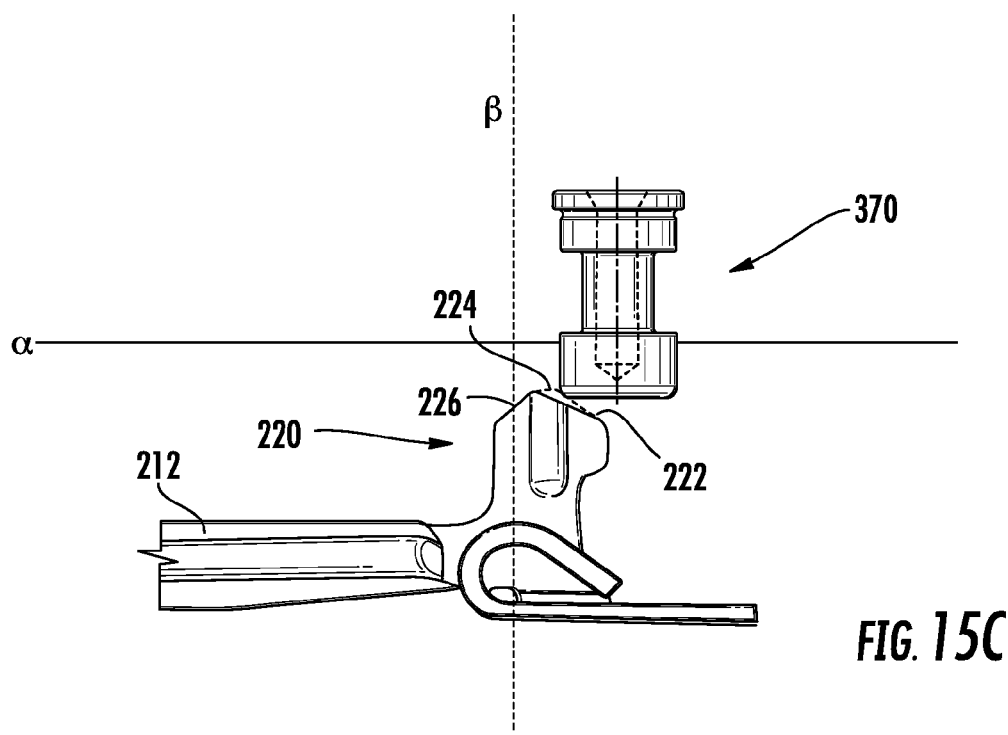

FIGS. 15A-15C show the plunger safety mechanism.

Figure 16:
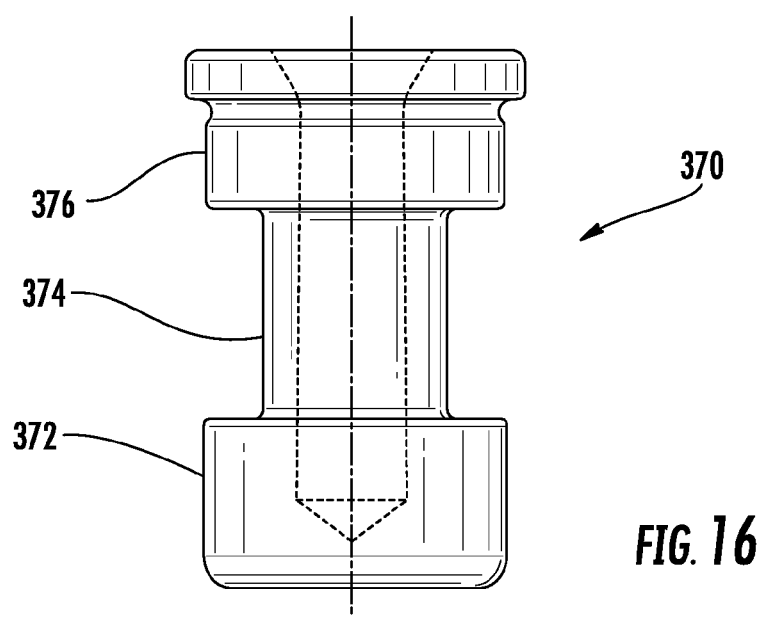
FIG. 16 is a view of the plunger safety mechanism.

The striker block 370 acts as a safety device within the firearm 100. As shown in FIG. 16, the striker block 370 has a lower section 372, mid section 374, and an upper section 376. The striker block 370 is placed within a depression within the slide 104, with the curved lower section 372 facing downward, and the flat upper section 376 against a striker block spring (not shown).

Alteration of the shape and texture of the lower section 372 of the striker block 370 affects the interaction with the modified trigger bar spur 220. A smoother shape, or more gradual curvature, reduces resistance. Shaper edges increase resistance. Alteration is made to match the preferences of the user.

The striker block 370 interacts with the firing pin 260. When the striker block 370 is in its lowered position the firing pin 260 cannot be released to contact a cartridge, and thus the firearm 100 cannot be fired.

Alterations to the trigger bar 212 that reduce the pre-travel of the trigger bar may disable the striker block 370, rendering the firearm 100 unsafe. A reduction in pre-travel could be of great benefit to a user with smaller hands by putting the trigger within reach, and thus rendering the gun more usable and safer.

FIG. 15A shows the interaction between the trigger bar spur 220 and the striker block 370 of an unmodified firearm 100. The center of the trigger bar spur 220 lines up with line β. Striker block 370 is in its lowered position with respect to line α, which represents the slide 104.

FIG. 15B shows the interaction between the trigger bar spur 220 of a firearm 100 and the striker block 370 of a firearm that includes the trigger bar pre-travel pin 258. The center of the trigger bar spur 220 is now past line β in a resting state, and the result is that the striker block 370 is raised with respect to line α. This may disable striker block 370, rendering the safety ineffective.

FIG. 15C shows a modified trigger bar spur 220 that addresses this problem. The modified trigger bar spur 220 includes a spur upramp 222 that has been increased in length, sacrificing a portion of the spur top 224. The spur downramp 226 can be left unchanged in length, or decreased.

The result is trigger bar spur downramp 226 that is shorter in length than the trigger bar spur upramp 222.

The result is that at a resting state, even with the pre-travel reduction shown by the center of the trigger bar spur 220 past line β in a resting state, the striker block 370 remains in its lowered position with respect to line α. Therefore the user benefits from the pre-travel reduction, but without sacrificing safety.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A reset-assist mechanism for use in a firearm, the firearm including a frame, trigger, and trigger bar, the reset-assist mechanism comprising:
   a. a compression spring having a first end, a second end, and a longitudinal axis, the longitudinal axis having a normal vector;

i. anti-rotation flats along the compression spring, the anti-rotation flats being perpendicular to the normal vector; and
   ii. the compression spring placed within a sear block of the firearm, the trigger bar in sliding relationship with the compression spring;
   b. a sear comprising:
   i. a front section having a right face and a left face separated by a sear width, the sear width being the distance between the left face and the right face;
   ii. a rear section;
   iii. a fulcrum between the front section and the rear section; and
   iv. an engagement protrusion extending from the right face of the front section;
   v. the engagement protrusion extending substantially parallel to the fulcrum; and
   vi. the engagement protrusion having a protrusion length measured from the right face, the protrusion length being at least 25% of the sear width;
   c. the sear installed within the sear block and in contact with the trigger bar.

2. The reset-assist mechanism of claim 1:
   wherein the compression spring has an inner boundary and an outer boundary;
   the inner boundary having a circular shape; and
   the outer boundary having a circular shape, with the anti-rotation flats removing a portion of the outer boundary to create a flat section.

3. The reset-assist mechanism of claim 2 further comprising:
   a trigger bar fulcrum pin;
   the trigger bar fulcrum pin affixed to the trigger bar near a midpoint of the trigger bar, the trigger bar fulcrum pin moving together with the trigger bar;
   the trigger bar fulcrum pin pushing the trigger bar away from the frame of the firearm, creating a point about which the trigger bar may rotate;
   whereby the rotation of the trigger bar increases a force of the trigger bar against the engagement protrusion of the sear, thus increasing trigger reset.

4. The reset-assist mechanism of claim 1 further comprising:
   a trigger bar fulcrum pin;
   the trigger bar fulcrum pin affixed to the trigger bar near a midpoint of the trigger bar, the trigger bar fulcrum pin moving together with the trigger bar;
   the trigger bar fulcrum pin pushing the trigger bar away from the frame of the firearm, creating a point about which the trigger bar may rotate;
   whereby the rotation of the trigger bar increases a force of the trigger bar against the engagement protrusion of the sear, thus increasing trigger reset.

5. The reset-assist mechanism of claim 1 further comprising:
   a pre-travel reduction pin affixed to the trigger bar;
   the pre-travel reduction pin contacting the frame of the firearm;
   the pre-travel reduction pin configured to reduce pre-travel of the trigger bar within the firearm by contacting the frame of the firearm to reduce forward motion of the trigger bar, without requiring modification of the trigger.

6. The reset-assist mechanism of claim 1 further comprising:
   a modified trigger bar spur comprising:
   a trigger bar spur upramp;
   a trigger bar spur top; and
   a trigger bar spur downramp, the trigger bar spur downramp shorter in length than the trigger bar spur upramp.

7. The reset-assist mechanism of claim 6 further comprising:
   a pre-travel reduction pin affixed to the trigger bar;
   the pre-travel reduction pin contacting the frame of the firearm;
   the pre-travel reduction pin configured to reduce pre-travel of the trigger bar within the firearm by contacting the frame of the firearm to reduce forward motion of the trigger bar, without requiring modification of the trigger.

* * * * *